Figure 1:
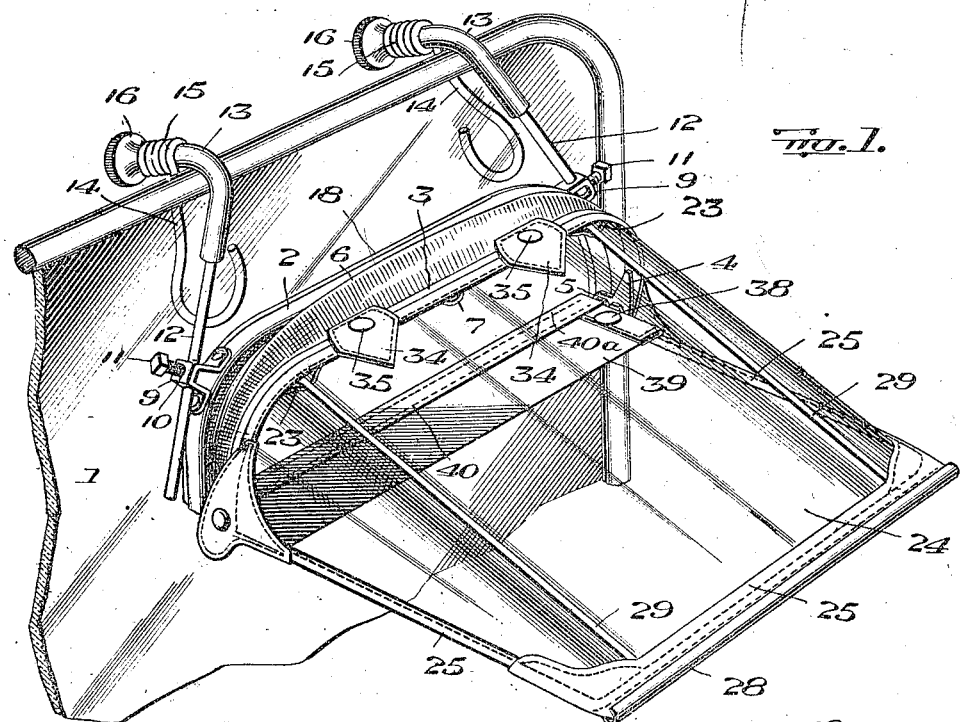

W. M. CHRISTOPHER.
ADJUSTABLE STORM AND LIGHT SHIELD.
APPLICATION FILED DEC. 13, 1917.

1,309,352.

Patented July 8, 1919.
2 SHEETS—SHEET 1.

Witnesses
Philip E. Barnes

Inventor
William M. Christopher
By Geo. A. Hawkins
his Attorney

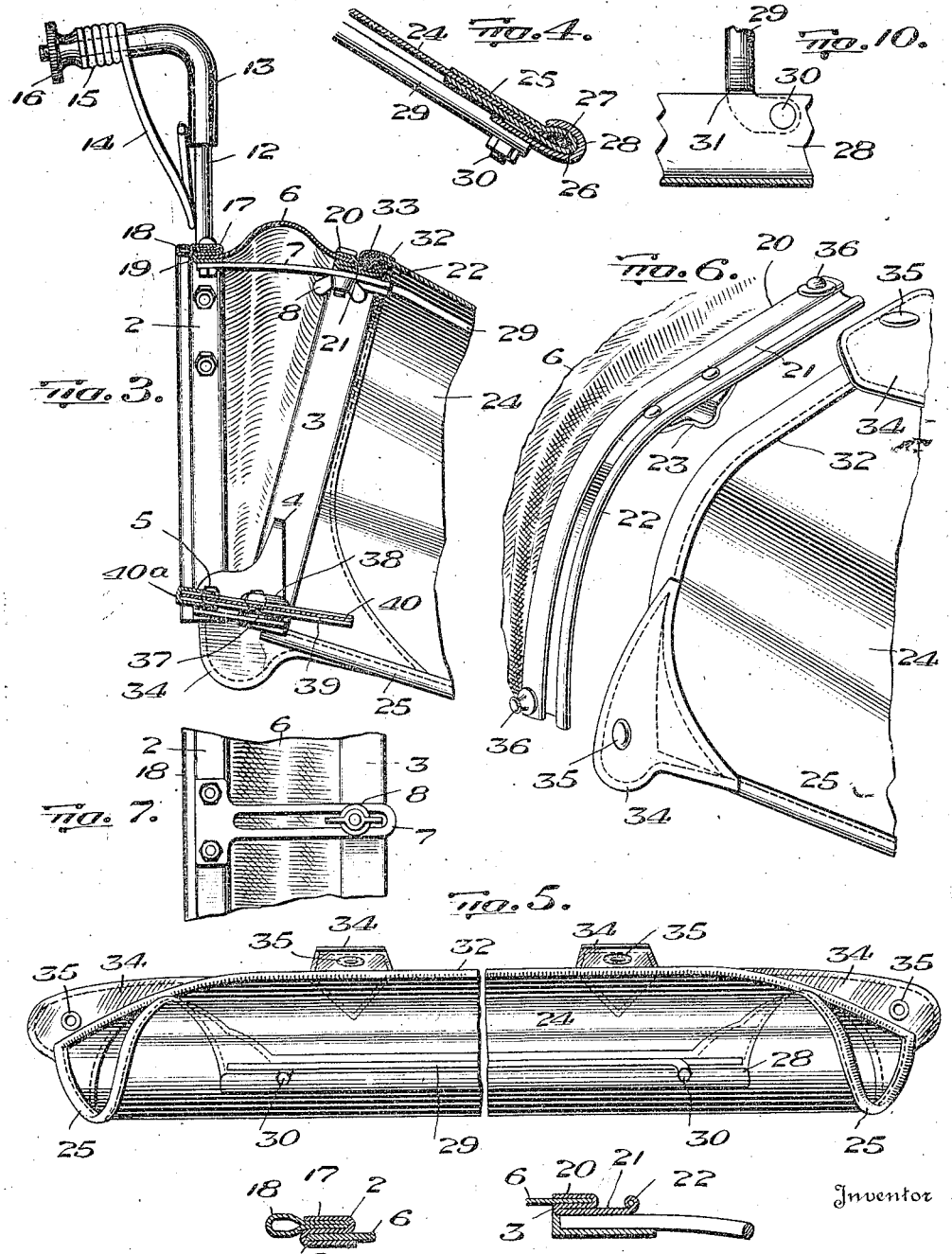

UNITED STATES PATENT OFFICE.

WILLIAM M. CHRISTOPHER, OF AMSTERDAM, NEW YORK.

ADJUSTABLE STORM AND LIGHT SHIELD.

1,309,352.　　　　　Specification of Letters Patent.　　　Patented July 8, 1919.

Application filed December 13, 1917. Serial No. 206,915.

*To all whom it may concern:*

Be it known that I, WILLIAM M. CHRISTOPHER, a citizen of the United States, residing at Amsterdam, county of Montgomery, and State of New York, have invented certain new and useful Improvements in Adjustable Storm and Light Shields, of which the following is a specification.

This invention relates to an adjustable storm and light shield for automobiles and motor boats.

The object of the present invention is the provision of a clear vision storm and light shield which can be readily attached to, or removed from, the wind shield of an automobile or motor boat and will be adapted for adjustment up and down, or horizontally, so that it may be set at any desired height or lateral position and, further, one which will be adapted for use on a wind shield which is set at any angle.

Further objects are the provision of a storm and light shield of novel form comprising top and sides arranged to prevent rain from driving thereunder; further, a spatter guard combined in a novel manner with the shield to prevent rain from spattering up on the wind shield, underneath the storm and light shield, during a driving storm, and which may be removed when not needed.

Another object of my invention is the provision of a novel arrangement of relatively movable frames, adapted for connection to the wind shield of an automobile or motor boat, connected by extensible and collapsible means such, for instance, as cloth or fabric, one of the frames having means for its attachment to the wind shield and the other being adapted for the attachment thereto of a storm and light shield, whereby the device is adapted for use on a wind shield which is set at any angle.

A further object of the invention is the provision of a storm and light shield having improved means for its attachment to a wind shield, whereby it may be raised and lowered to bring it at the desired elevation to suit the driver of the automobile or motor boat.

Other objects of the invention are the provision of a storm and light shield having a flexible pane made of a transparent material such as celluloid, and foldable braces by which said pane may be held in extended condition when attached to the wind shield and whereby, on folding said braces, said pane may be rolled up into compact form when the shield is not needed; a flexible pane adapted for connection to a wind shield and provided with a front edge binder and with brace rods connected thereto for rendering the pane rigid when attached to the wind shield, the front edge binder being detachable from the pane so that a new pane may be substituted for a broken one at any time; a storm and light shield having a detachable spatter guard; a tinted storm and light shield adapted to serve not only as a protector from the rain but as a window or pane through which the driver of the automobile can safely approach a strong light without being confused, thereby minimizing the danger from dazzling headlights on other cars; a storm and light shield having a frame for connection to the wind shield and provided with an improved edging which forms a tight, non-rattling, joint between the frame and the wind shield, preventing breakage of the latter and compensating for any inequality in the frame or wind shield; a storm and light shield comprising a frame adapted for attachment to the wind shield and a detachable pane or shield having an improved joint with said frame.

Other objects and advantages of the invention will appear more fully hereinafter.

The invention is susceptible of modification and the embodiment hereinafter set forth and shown in the drawings is, therefore, to be considered as illustrative, rather than restrictive, of the scope of the invention.

Figure 2:
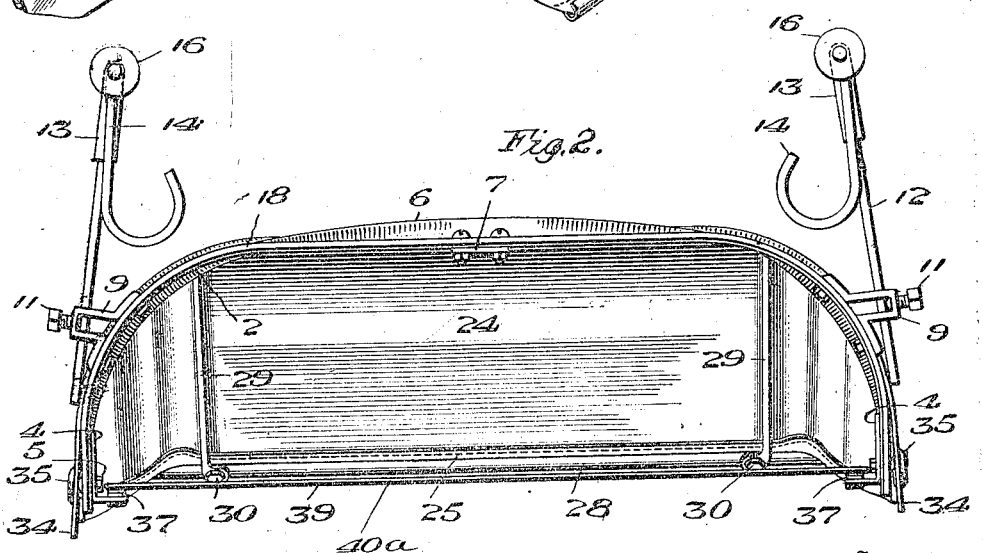

In the accompanying drawings:

Figure 1 is a perspective view of the invention, applied to a windshield;

Fig. 2, a rear elevation, detached from the windshield;

Fig. 3, a detail vertical section, broken away;

Fig. 4, a detail section through the front edge of the pane and edge holder;

Fig. 5, a view of the pane rolled up, the braces being folded;

Fig. 6, a detail of a part of the outer frame, showing the groove or channel, a brace socket, and part of the pane in position for attachment to the frame;

Fig. 7, a detail bottom view of the adjustable connector for the inner and outer frames;

Fig. 8, a detail section through the inner frame, flexible strip, and the fabric connecting the frames;

Fig. 9, a detail section through the outer frame, showing the brace socket; and

Fig. 10, a detail of a brace pivot.

The invention is shown in Fig. 1 applied to the wind shield 1 which may be set at any angle, as the adjustability of the parts enables the device to be arranged to suit the convenience of the driver whether the wind shield 1 is vertical or set at an angle to the vertical.

There are two arched frames 2 and 3, to the outer one 3 of which are secured the brackets 4 which are pivoted at 5 to the inner frame 2. The frames are connected by cloth, fabric, or other flexible material 6 whereby the outer frame 3 can be set at different angles in relation to the inner frame 2 without permitting rain, snow, or sleet to pass between the frames. This construction enables the shield to be applied to any wind shield no matter what the angle of the latter. Any suitable means may be employed to secure the outer frame where set; there is shown a slotted bracket 7 secured to the frame 2, and a screw and thumb nut 8 carried by the frame 3 which clamps against said bracket.

The inner frame 2 carries brackets 9 having vertically arranged holes 10 and provided with clamping screws 11. Hangers 12 are slidable in the holes 10 and are held by the screws 11, thus enabling the frames 2 and 3 to be raised or lowered to set the device at any desired height. The hangers are incased in pieces of rubber tubing 13 where their angular portions engage the upper edge of the wind shield and down the front thereof. Clamps 14 have coiled parts 15 which are journaled on the horizontal or bent parts of the hangers 12 and are held by thumb nuts 16. The clamps are thus swingingly mounted to move in a vertical plane, enabling them to be readily raised or lowered and to be swung down back of the wind shield or elevated out of engagement therewith. The resiliency of the clamps affords a secure, yet yielding, connection which prevents injury to the wind shield.

The inner frame 2 is re-bent at 17 and in the channel thus provided is secured a folded or doubled flexible strip 18 which is preferably of sheet rubber. This strip is secured both by gluing or cementing and by the clamping action of the re-bent part 17 thereon. The edging thus provided projects freely from the frame 2 and bears on the wind shield, adapting the device to any irregularities in either the frame or the wind shield and preventing rattling. I am aware that other materials than rubber could be employed and that this strip could be directly fastened, as by riveting, to the frame 2.

The cloth or fabric 6 is secured to the frame 2 by entry between the re-bent portion 19 thereof, said re-bent portion being clamped against the fabric 6.

The forward edge of the fabric 6 is received in a re-bent portion 20 on the outer frame 3, said re-bent portion being bent against the fabric to hold it.

The frame 3 is provided with a channel 21 which is located between the re-bent portion 19 and a bead 22 on said frame 3. Sockets or holders 23 are carried by the frame 3.

As thus far described, the frames, hangers and clamps constitute a structure which can be applied to, or removed from, the wind shield and allowed to remain thereon whether or not the pane or shield, now to be described, is attached thereto. I am aware that that part of the invention heretofore described is adapted for the attachment of a pane or shield differing in construction from that now to be described, and while the pane or shield hereinafter set forth is the preferred kind, I do not limit myself to the use of the hinged frames 2 and 3 and foldable fabric connection therebetween, solely in connection with the pane which I have shown.

My improved pane 24 is preferably of celluloid so as to be light and adapted to be rolled up. It is tinted preferably of an amber color, to prevent glare reaching the eyes of the driver, thereby enabling another car to be approached without the driver becoming confused by the dazzling light from the head-lights. The side edges of the pane are reinforced by some suitable material at 25. The lower edge has the same reinforcing material and along said edge there is formed a loop or bead 26 in which is a flexible rod 27, preferably a piece of ratan.

An edge holder 28 receives the loop 26 and filler 27 and is tightly frictionally engaged therewith, thus stiffening the front edge of the pane, while permitting said front edge to be readily slid out of said edge holder 28. Brace rods 29 which are pivoted at 30 to the edge holder 28 have shoulders 31 (Fig. 10) adapted to engage the holder 28 to limit the outward swinging of said rods when they are in extended condition. The rods are adapted to fold alongside of the holder 28 so that the pane may be rolled up as shown in Fig. 5. The ends of the rods 29 are adapted for reception in the sockets or holders 23 on the frame 3. The upper edge of the pane is reinforced at 32 in which is contained a flexible strip 33, preferably of ratan. The reinforce at 32 with its contained strip 33 is adapted to enter the channel 21 and be confined between the re-bent part 20 and the bead 22. Tabs 34 on the upper edge of the pane are provided with snap sockets 35 adapted to receive studs 36 on the frame 3 whereby the pane is secured to the frame 3 and made to conform thereto with downwardly extending side portions 24ª.

The brackets 4 carry studs 37 for the reception of the sockets 38 on the ends of the spatter guard 39. This guard is of celluloid and has its edges reinforced by any suitable fabric as at 40. When the guard is attached to the brackets 4 the rear reinforced edge thereof bears against the wind shield 1, forming a tight joint and preventing rain, in a driving storm, from spattering up underneath the pane and against the wind shield. The reinforcement at the rear of the spatter guard is formed with a free looped part 40ª where it contacts with the wind shield, enabling it to tightly conform thereto at all points.

The entire device can be removed from the wind shield, or, the pane and its brace rods taken off, leaving the frames 2 and 3 on the wind shield, or, the spatter guard can be applied or removed at will. The brace rods can be folded and the pane rolled up to furnish same in convenient form to be stowed in the automobile or boat or elsewhere. If desired, the brace rods can be folded, and the pane rolled up and left attached to the frame 3.

The cloth or fabric 6 can be removed from the frames 2 and 3 by using a case knife and a new piece of cloth or fabric inserted if the old one wears out.

The device may be set laterally to any desired position on the windshield.

What is claimed is:—

1. A storm and light shield comprising relatively movable inner and outer frames hinged together at their lower portions for relative adjustment, means carried by one of said frames for connecting it to a windshield, pliable or flexible material connecting the frames constituting the top of the shield, means for securing the outer frame in any desired position in relation to the inner frame, and an outstanding pane carried by the outer frame.

2. A storm and light shield comprising relatively movable inner and outer frames hinged together at their lower portions for relative adjustment, means carried by one of said frames for connecting it to a windshield, pliable or flexible material connecting the frames constituting the top of the shield, means for securing the outer frame in any desired position in relation to the inner frame, and a flexible, foldable pane detachably carried by the outer frame.

3. A storm and light shield comprising relatively movable inner and outer frames hinged together at their lower portions for relative adjustment, means carried by one of said frames for connecting it to a windshield, pliable or flexible material connecting the frames constituting the top of the shield, means for securing the outer frame in any desired position in relation to the inner frame, a flexible, foldable pane detachably carried by the outer frame, and releasable braces connected to the outer frame and to the pane which hold the latter in outstanding or stretched position.

4. A storm and light shield comprising relatively movable frames which are hinged together, an extensible and contractible connection closing the space between said frames, means carried by one of said frames adapted for connecting the frames to a wind shield, a flexible pane adapted for detachable connection to the outer one of said frames, and brace rods connected to said pane which are detachably connected with the frame last named.

5. A storm and light shield comprising relatively movable frames which are hinged together, an extensible and contractible connection closing the space between said frames, means carried by one of said frames adapted for connecting the frames to a wind shield, a flexible pane adapted for connection to the outer one of said frames, and brace rods jointed to the outer part of said pane and having free parts adapted for detachable connection to the outer frame, said rods being foldable crosswise of the pane to permit the latter to be rolled up.

6. A storm and light shield comprising a flexible pane having a flexible reinforcing strip at one of its edges, a rigid channeled member in which the reinforced edge of the pane is removably received, and means for connecting the pane to a wind shield.

7. A storm and light shield comprising a channeled frame having means for connecting it to a wind shield, a flexible pane having a flexible reinforcing member along one of its edges which is adapted to be received in said channeled member aforesaid, means for connecting the reinforced edge of the pane to the frame, a rigid reinforcing member for the outer edge of the pane, and brace rods connected to said rigid reinforcing member and detachably connected to the frame.

8. A storm and light shield comprising an arched frame adapted for connection to a wind shield, a pane secured to said frame, and a removable spatter guard whose ends are connected to the downwardly extending parts of said arched frame below the pane and arranged to contact with the wind shield.

9. A storm and light shield comprising an arched frame adapted for connection to a wind shield, a flexible pane detachably engaged with and conforming to the arched frame, thereby providing a top and sides for said pane, and a spatter guard bridging the frame and having its ends detachably connected thereto below the pane and arranged to engage the wind shield, permitting the spatter guard to be attached or removed without removing the frame or pane.

10. A storm and light shield comprising frames which are hinged together, an expansible and collapsible connection closing the space between said frames, means for connecting the inner frame to a wind shield, a pane attached to the outer frame and having a top and sides, and a spatter guard extending across the side of said frames and connected thereto below the top of the pane.

11. A storm and light shield comprising a frame and a pane or shield connected thereto, and hangers having laterally swinging clamps, the hangers being adjustable up and down in relation to the frame and the clamps being adapted to engage the wind shield.

12. A storm and light shield comprising a frame and a pane or shield connected thereto, brackets on the frame, hangers slidable up and down in the brackets, clamping devices for securing the hangers where set, and laterally swinging clamps carried by the hangers and arranged so as to be adapted to engage the inside face of a wind shield.

In testimony whereof, I hereunto affix my signature.

WILLIAM M. CHRISTOPHER.